May 23, 1950  N. S. RICHARDSON  2,508,969
COMBINED BATHTUB AND SHOWER CLOSURE
Filed Sept. 12, 1947  4 Sheets-Sheet 1
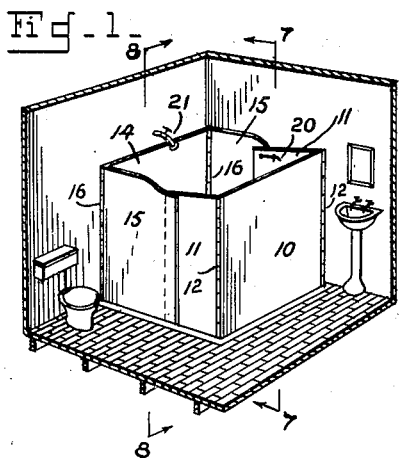
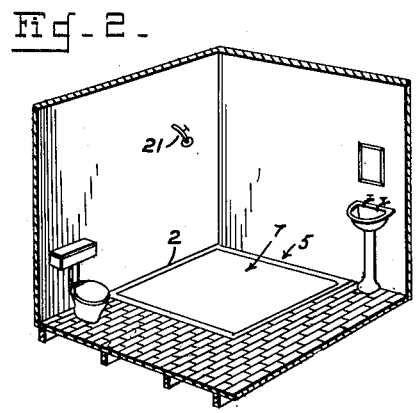
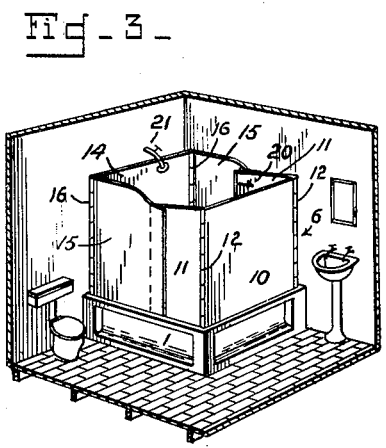
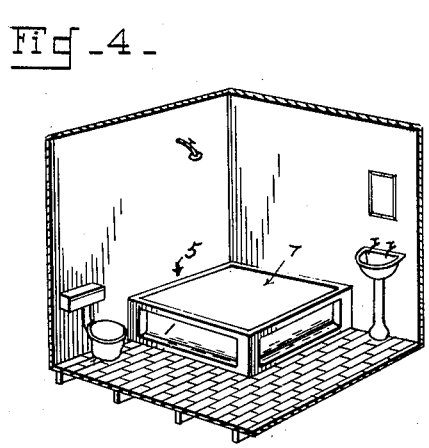
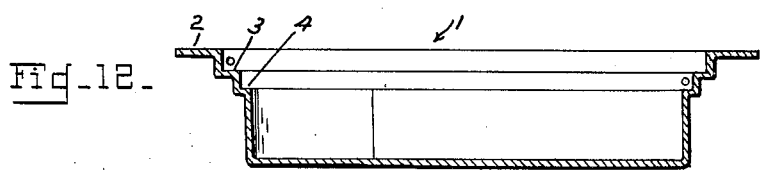
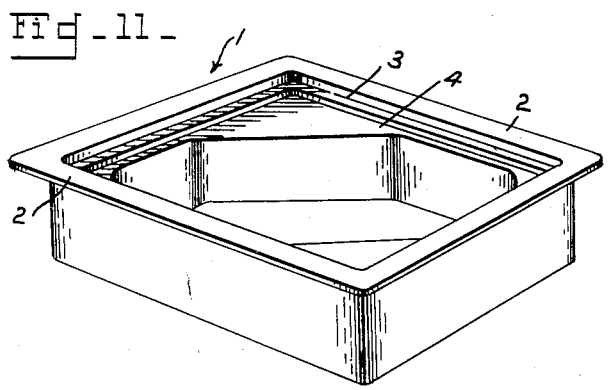
INVENTOR.
Norma S. Richardson,
BY
ATTY May 23, 1950   N. S. RICHARDSON   2,508,969
COMBINED BATHTUB AND SHOWER CLOSURE
Filed Sept. 12, 1947   4 Sheets-Sheet 2
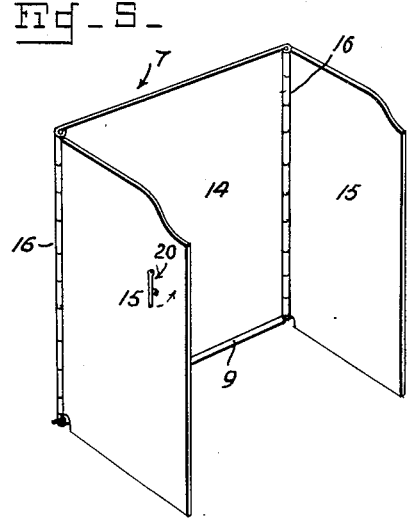
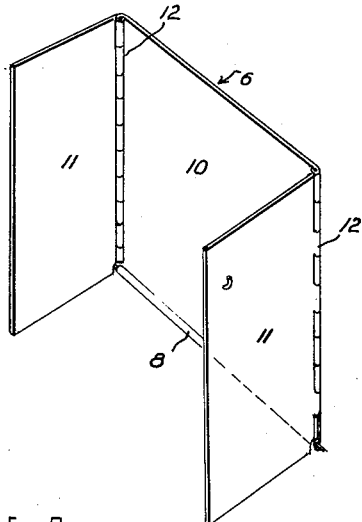
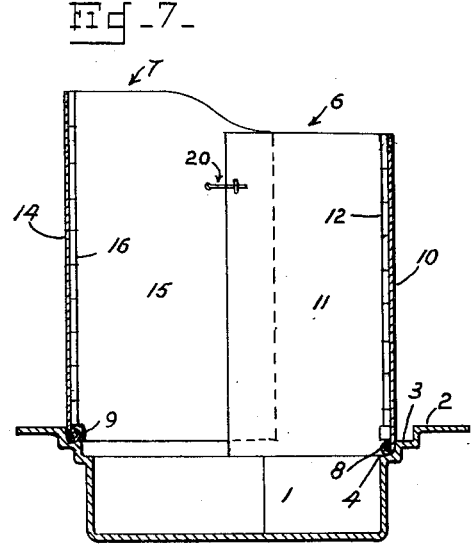
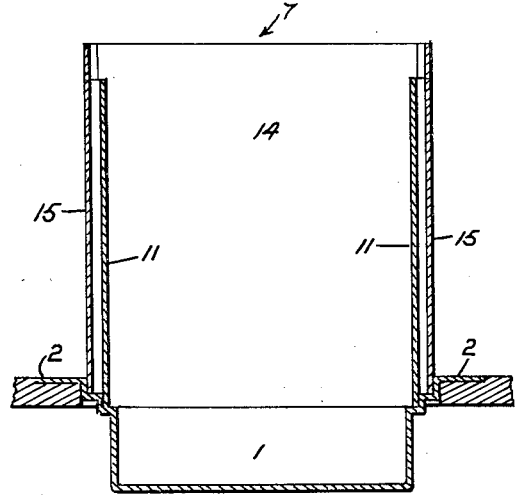
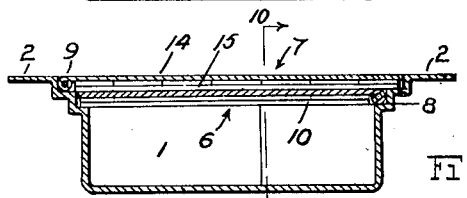
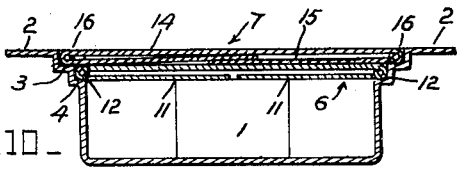
INVENTOR.
Norma S. Richardson,
BY
ATTY May 23, 1950 N. S. RICHARDSON 2,508,969
COMBINED BATHTUB AND SHOWER CLOSURE
Filed Sept. 12, 1947 4 Sheets-Sheet 3

INVENTOR.
Norma S. Richardson,
BY
Atty.

May 23, 1950          N. S. RICHARDSON          2,508,969
COMBINED BATHTUB AND SHOWER CLOSURE
Filed Sept. 12, 1947          4 Sheets-Sheet 4
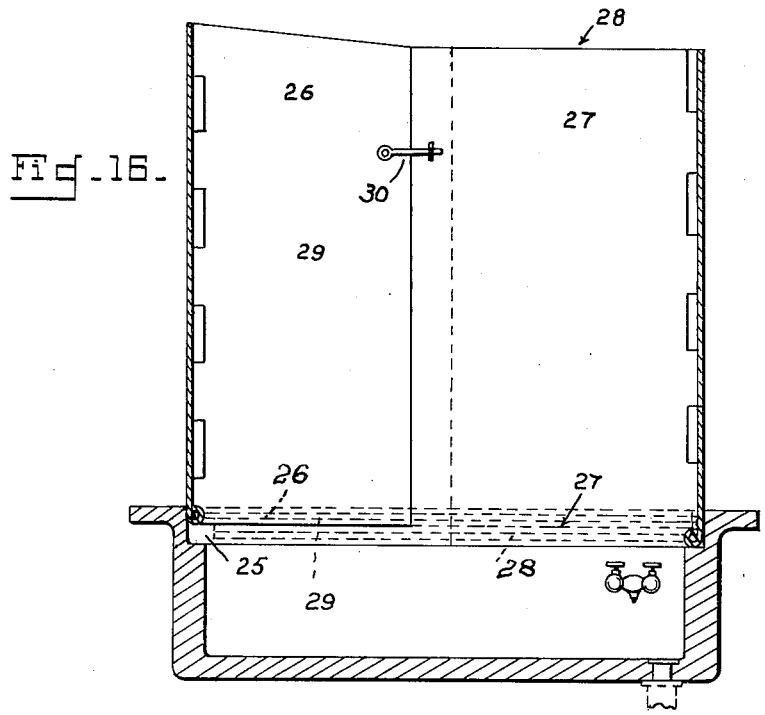
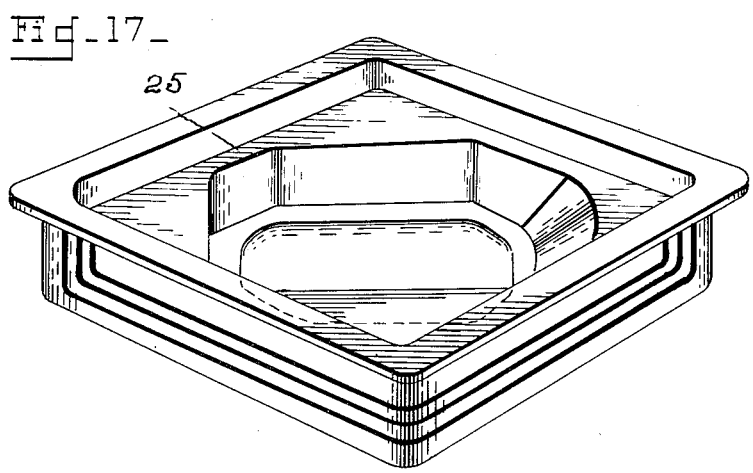
Inventor
Norma S. Richardson
Attorney Patented May 23, 1950

2,508,969

UNITED STATES PATENT OFFICE 2,508,969

COMBINED BATHTUB AND SHOWER CLOSURE

Norma S. Richardson, Petersburg, Va.

Application September 12, 1947, Serial No. 773,625

9 Claims. (Cl. 4—148)

This invention relates to improvements in a combined bath tub and shower closure.

In small homes, space is such an important factor, bath tubs or showers are frequently either omitted, or the equipment is so small it amounts to little or no value. Even when small tubs or shower equipment are used, so much valuble space is utilized as to practically take up all the available room. Thus, little or no space is left for the other usual equipment necessary and usual in a bath room.

The purpose of this invention is to provide a bath room structure primarily designed for small rooms where space is a factor, and yet be able to provide a normal size tub and what may be termed a normal size closure for shower purposes, at the same time so arrange the structure, the space required may be used for other than bath purposes.

I accomplish the desired purpose by utilizing a square tub, such for instance as the general type of tub disclosed in the patent to Albert E. Steinkamp, No. 1,844,988, and associate with such a tub a collapsible closure or cabinet. This closure is so arranged it may be collapsed to form a cover for the tub to increase the floor space of the room or elevated above the tub to provide a closure for the shower compartment. The tub will be preferably supported below the floor level with its upper edge level with the floor to form a continuation of the same when the closure is folded or collapsed, but the invention is not to be construed as limited to a sunken tub.

Such an arrangement will provide in a small space a bath and shower with the usual normal size equipment, and yet when not in use the space occupied by the equipment can be utilized to form a part of the bath room floor, a very vital factor where space is essential for purposes other than bathing.

I accomplish the desired result by the construction and arrangement shown in the accompanying drawing, in which:

Fig. 1 is a perspective view of my improved bath tub, showing the shower closure in open condition.

Fig. 2 is a similar view showing the closure in closed position on a tub.

Figs. 3 and 4 are views similar to Figs. 1 and 2 but showing the tub supported on a floor.

Figs. 5 and 6 are detail perspective views of the closure sections.

Fig. 7 is a section on the line 7—7 of Fig. 1.

Fig. 8 is a section on the line 8—8 of Fig. 1, the side section being spaced apart for illustrative purposes.

Fig. 9 is a section similar to Fig. 7 but showing the sections in collapsed condition.

Fig. 10 is a section on line 10—10 of Fig. 9.

Fig. 11 is a perspective view of a tub to show the flanges or seats to support the sections.

Fig. 12 is a section of the same.

Fig. 16 is a sectional view showing a tub with a single flange.

Fig. 17 is a perspective view of tub shown in Fig. 16.

Figure 13:
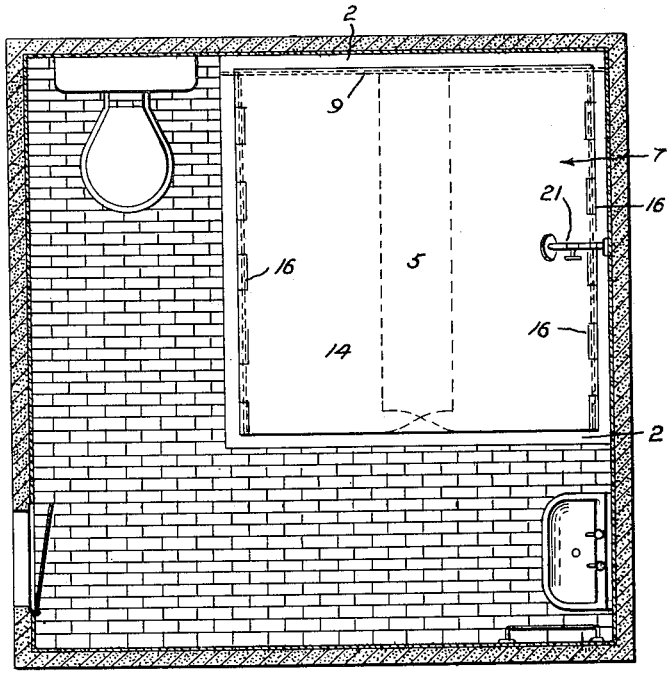
Fig. 13 is a diagrammatic plan view of a bathroom illustrating the invention.
Figure 14:
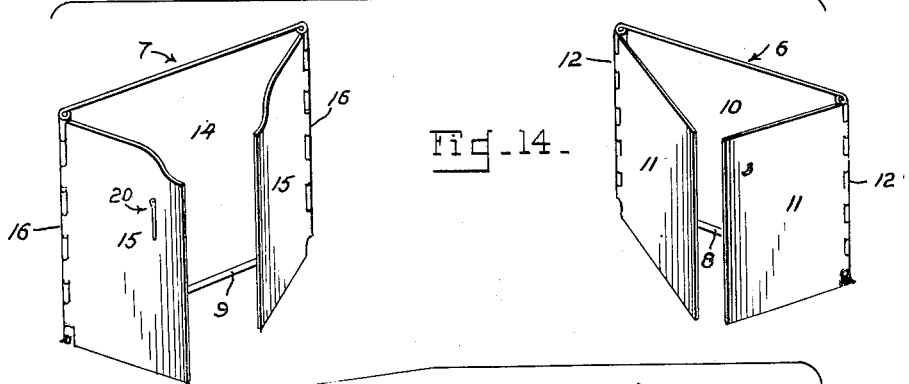
Fig. 14 shows perspective views of the closure sections partially folded.
Figure 15:
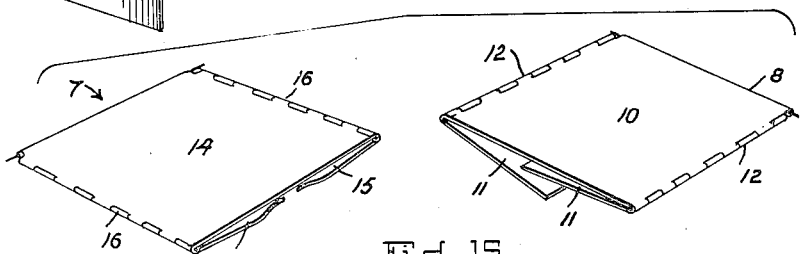
Fig. 15 shows similar views, the closure sections being folded.

In the drawings, 1 indicates a standard square bath tub, which may be plain on the inside or provided interiorly with the usual seats and other details ordinarily found in such an up-to-date square tub.

When the tub is to be supported below the floor level, the upper edge is provided with an outwardly extending flange 2. Inside this flange is another horizontal flange or seat 3, and at the inner edge of flange 3 is another or second horizontal flange or seat 4.

Associated with the tub is a collapsible shower closure or compartment 5. This closure is composed of two collapsible sections, 6 and 7, the section 6 being hinged to the tube at 8, above the seat or flange 4, and section 7 being hinged on the opposite side of the tub at 9 above the flange or seat 3.

The section 6 comprises an end wall 10 and two parallel side walls 11, hinged to the vertical edges of the end wall, as shown at 12. The width of the end wall equals the distance between the vertical sides of the flange or seat 4, so that when the side walls are opened up they will be supported on the flange or seat 4, as shown in Figure 7.

The companion section comprises an end wall 14, and two side walls 15—15 hinged at 16 to the vertical edges of the end wall 14. The lower edges of the side walls, when the section 7 is raised, rest on the flange or seat 3 as shown in Fig. 7.

The tub may be sunk in the floor as shown in Figs. 1-1 and 7-8, with the flange 2 level with the floor, or if desired the tub may be supported on the floor as shown in Figs. 3 and 4.

If it is desired to collapse the shower closure, as shown in Fig. 2 or Fig. 4, the side walls 11 of section 6 are folded inwardly against the end wall 10 and then the section is turned down on its hinge 8, and in folded condition is supported on the flange or seat 4, as shown in Figs. 9 and 10. The side walls of section 7 are folded inwardly against the end wall 14, and in this folded condition section 7 is turned down on its hinge 9 and over the top of section 6, and onto the flange or seat 3, level with the floor if the tub is sunk as shown in Fig. 2 or flush with the upper edge of the tub if the latter is supported on the floor, as shown in Fig. 4.

Assume the closure to be closed as shown in Fig. 2, and it is desired to open the closure sections for shower puroposes, as shown for instance in Fig. 1. Section 7 is turned up on its hinge 9, and then the side walls 15—15 are opened up on their hinges 16. This brings the bottom ends of the side walls in line with the flange or seat 3 which serves as a support. The section 6 is turned up on its hinge 8; the side walls 11—11 opened up on their hinges. This brings the lower ends of the side walls in line with the flange or seat 4 which serves as a support, as shown in Figure 7.

The side walls 15 are somewhat wider than the side walls 11 to form an overlap when the sections are in closure formation. A catch 20 secures the two sections together when used as a shower cabinet.

When the sections are opened up in shower closure position, the usual sprinkler 21 projects from the side wall of the room over the closure, and any water splashing against the walls of the closure runs down the sides and is drained off into the tub.

With the construction described, a full length sanitary shower is provided. For instance, assume a square tub is four feet wide, and fifteen inches deep. That means the sections being four feet long raised above the edge of the tub, plus the depth of the tub amounts to a closure over five feet high. Yet a structure is provided which affords bath room floor space when the sections are collapsed.

Obviously this arrangement accomplishes three important functions; first, it permits the use of a standard size square bath tub in a small bath room where space is a factor; second, where the tub is not used for bathing purposes, and the closure sections are collapsed on the tub it lends floor or other space to the room which can readily be used for purposes other than that of space for a bath tub; and third, by making the closure sections of metal or the like it dispenses with the use of unsanitary and wet curtains ordinarily employed when a bath tub is converted to shower purposes.

The main wall of the section 7, which forms the cover for the tub when the parts are collapsed, is on a level with the floor, and it may be covered with a rug, rubber or even stained to match the floor, to present a neat appearance.

The metal sections may be enameled, or painted to suit the artistic taste of the owner.

In Figures 16 and 17 I have shown a tub with a single flange 25, on opposite sides of which are hinged the end sections, 26 and 27.

In this form the upper section 26, when the closure is collapsed, is supported on the lower collapsed opposite section 27, as distinguished from being supported on a flange as in the preferred form.

When the sections 26 and 27 in this form of the invention are opened up for shower purposes, the lower ends of the side walls 28 of section 27 will be supported on the flange 25, while the companion side walls 28 of the companion section 26 and the section itself will be retained in stable position by a lock 30 between the two sections.

In other respects the improvement is the same as in the preferred form.

What I claim is:

1. A combined bath and shower structure comprising a bath tub, and collapsible closure sections hinged to the upper portion of the tub, said sections being adapted to be folded down on the tub or opened up to form with the tub a shower closure.

2. A combined bath and shower structure comprising a bath tub having a flange at its upper edge, and opposite collapsible closure sections hinged to the flange, each closure section including an end wall and side walls hinged to the end wall, whereby said sections can be collapsed within the flange to form a cover for the tub or opened up to form with the tub a shower closure.

3. A combined bath and shower structure comprising tub supported below the level of a floor, and collapsible closure sections hinged at opposite ends of the tube, said closure sections each comprising a main wall and side walls hinged to the main wall, the side walls being of less width than the end walls, whereby the closure sections can be collapsed and folded over each other on the upper portion of the tub on a level with the floor, or opened up to form with the tub a shower closure, the lower edges of the side walls resting on the upper portion of the tub when the sections are in shower closure position.

4. A combined bath and shower structure comprising a tub supported below a floor with its upper edge in the plane of the floor, said tub having a flange at its upper end, and oppositely disposed shower closure sections hinged to the upper inside of the flange, each closure section including an end wall and two side walls, the side walls being hinged to the end wall and of a width to fit between the opposite sides of the tub when folded against the end wall, the folded collapsible sections being nested together between opposite sides of the tub and supported thereby to form a cover for the tub in the same plane as the floor, said closure sections being adapted to be turned up on their hinges to form with the tub a shower compartment.

5. A bath and shower structure comprising a square bath tub supported below a floor level, the upper edge of the tub being in the same plane as the floor, the tub having a surrounding flange on its upper edge, a shower closure section hinged adjacent the flange between the opposite sides of the tub, said section including an end wall and two side walls hinged to the end wall, the width of the end wall being substantially the width of the distance between the opposite interior sides of the tub, the width of the side walls being less than the width of the tub, a second closure section hinged at the opposite end of the tub above the horizontal plane of the hinge of the companion closure section, said second closure section including an end wall and two side walls hinged to the end wall, the width of the end wall being substantially the width of the distance between opposite sides of the tub, and the width of the side walls being less than the width of the tub, whereby the sections can be collapsed to form a cover for the tub on a level with the floor or opened up to form with the tub a shower closure.

6. A bath and shower structure comprising a square tub, the upper inside edge of which is formed with two inwardly extended flanges, a collapsible closure section hinged inside the tub in line with one of said flanges, said section including an end wall and two foldable side walls of less width than the end wall and hinged to the latter, a second collapsible closure section hinged inside the tub in line with the second of said flanges, said second collapsible closure section comprising an end wall and two foldable side walls of less width than the end wall and hinged to the latter, whereby the sections can be folded and collapsed on the respective flanges or opened up on their hinges with the side walls supported on the flanges to form a shower closure.

7. A combined bath tub and shower closure comprising a tub and a series of collapsible shower closure sections permanently mounted on the upper edge of the tub and for movement to be opened up to form with the tub a closure or folded down on the tub substantially even with the upper edge of the tub.

8. A bath tub comprising a rectangular top flange surrounding a tub well, two exposed inwardly stepped flanges surrounding said tub well at different levels and connecting said tub well with said top flange, and a seat portion across a corner of the tub well and coinciding with the lower of said stepped flanges.

9. A combined shower cabinet and tub comprising a tub with an interior flange on the upper edge thereof, a collapsible cabinet hinged to the tub, said cabinet including a series of walls, said walls being hinged together to be folded on one another on the tub flange when the cabinet is not in use and opened in cabinet formation on the tub for shower purposes.

NORMA S. RICHARDSON.

REFERENCES CITED

The following references are of record in the file of this patent:

UNITED STATES PATENTS

| Number | Name | Date |
|---|---|---|
| Re. 21,019 | Steele et al. | Feb. 28, 1939 |
| D. 110,900 | Kraemer | Aug. 16, 1938 |
| 118,750 | Scholl | Sept. 5, 1871 |
| 1,495,413 | Hopponen | May 27, 1924 |
| 1,597,922 | Osborn | Aug. 31, 1926 |
| 1,990,871 | Klocke | Feb. 12, 1935 |
| 2,205,018 | Osuch | June 18, 1940 |
| 2,262,312 | Blanch | Nov. 11, 1941 |
| 2,334,293 | Stein | Nov. 16, 1943 |